(12) United States Patent
Atul et al.

(10) Patent No.: US 9,976,198 B2
(45) Date of Patent: May 22, 2018

(54) APPARATUS AND METHOD FOR SOLDER RECOVERY

(71) Applicant: EVS INT LTD, Cowes, Isle of Wight Hampshire (GB)

(72) Inventors: Limaye Atul, Pune (IN); Jog Sunildutta, Pune (IN); Simon Garve Norman, Isle of Wight Hampshire (GB)

(73) Assignee: EVS INT LTD, Cowes, Isle of Wight (GB)

( * ) Notice: Subject to any disclaimer, the term of this patent is extended or adjusted under 35 U.S.C. 154(b) by 184 days.

(21) Appl. No.: 14/765,764

(22) PCT Filed: Feb. 3, 2014

(86) PCT No.: PCT/EP2014/052065
§ 371 (c)(1),
(2) Date: Aug. 4, 2015

(87) PCT Pub. No.: WO2014/122100
PCT Pub. Date: Aug. 14, 2014

(65) Prior Publication Data
US 2015/0368746 A1    Dec. 24, 2015

(30) Foreign Application Priority Data

Feb. 5, 2013    (IN) .......................... 328/MUM/2013

(51) Int. Cl.
*C22B 7/00* (2006.01)
*B23K 3/08* (2006.01)
*C22B 7/04* (2006.01)

(52) U.S. Cl.
CPC ................ *C22B 7/003* (2013.01); *B23K 3/08* (2013.01); *C22B 7/04* (2013.01); *Y02P 10/212* (2015.11)

(58) Field of Classification Search
CPC ....................................................... C22B 7/04
See application file for complete search history.

(56) References Cited

U.S. PATENT DOCUMENTS

| | | | |
|---|---|---|---|
| 6,464,929 B1 | 10/2002 | Groteke | |
| 6,467,671 B1 * | 10/2002 | Unagami | ............... B23K 1/018 228/20.1 |
| 6,555,050 B1 * | 4/2003 | Groteke | .................... C21B 3/04 266/205 |
| 6,824,702 B1 * | 11/2004 | Ohrem | ..................... B01J 19/18 204/196.07 |
| 2002/0027157 A1 | 3/2002 | Takano | |
| 2003/0136816 A1 | 7/2003 | McDonald | |
| 2010/0187732 A1 | 7/2010 | Inuma | |
| 2015/0368746 A1 * | 12/2015 | Atul | ......................... C22B 7/04 75/690 |

OTHER PUBLICATIONS

International Search Report and Written Opinion issued in PCT/EP2014/052065 dated May 23, 2015.

* cited by examiner

*Primary Examiner* — Scott Kastler
(74) *Attorney, Agent, or Firm* — Stoel Rives LLP

(57) ABSTRACT

The invention provides an apparatus and a method for recovering good solder for re-use from dross. Dross is introduced into a chamber (108) which is heated, whilst agitation is provided by means e.g. of an impeller (116). Recovered solder is drained through a drain valve (118) which is suitably thermally activated. Waste can be collected by inversion of the vessel via a motorised pivot.

16 Claims, 12 Drawing Sheets

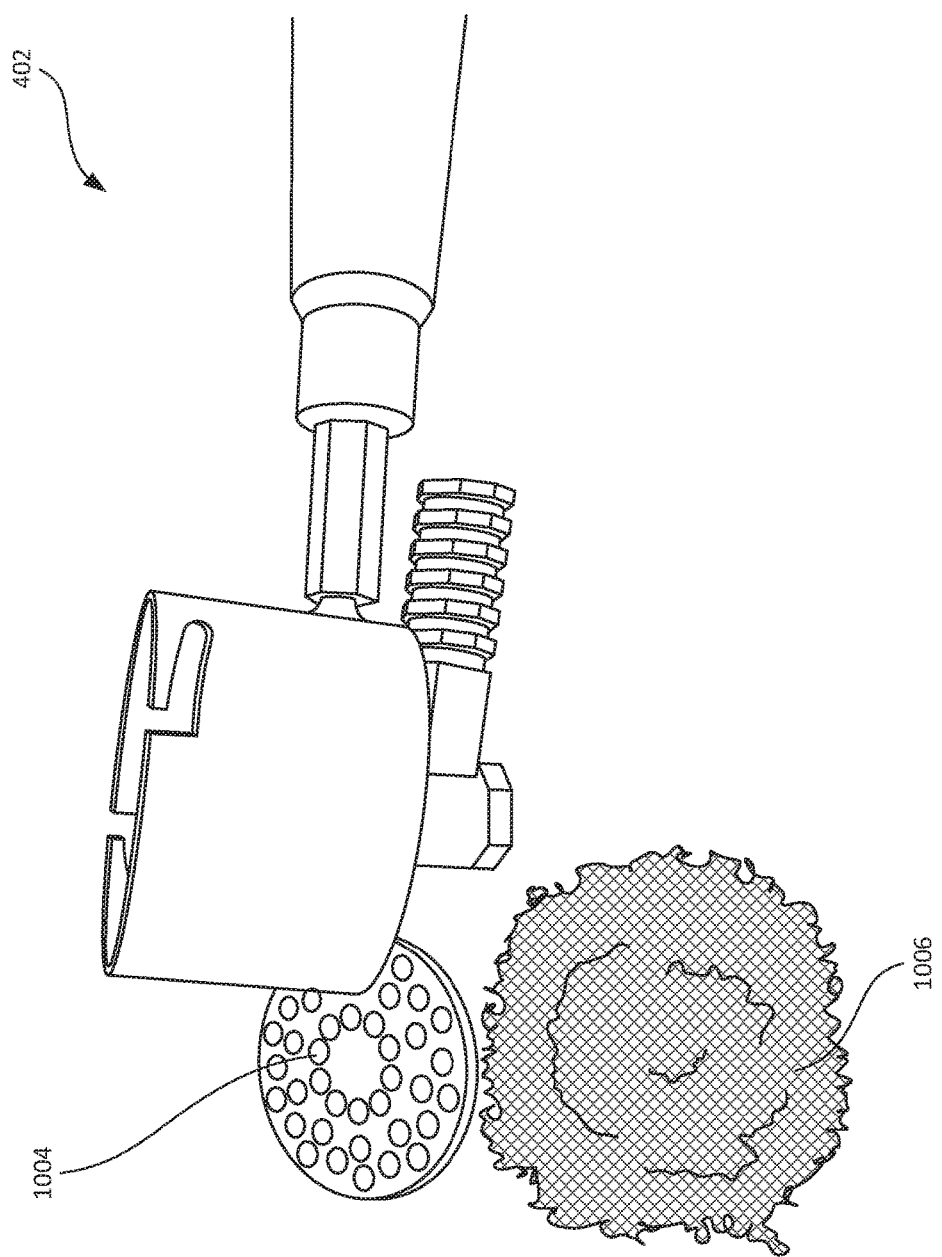

APPARATUS AND METHOD FOR SOLDER RECOVERY

CROSS-REFERENCE TO RELATED APPLICATIONS

This application is a national stage entry of PCT/EP2014/052065, entitled "APPARATUS AND METHOD FOR SOLDER RECOVERY," filed on Feb. 3, 2014, which claims priority to Indian Patent Application No. 328/MUM/2013, filed on Feb. 5, 2013, each of which is incorporated by reference in its entirety.

TECHNICAL FIELD

The present disclosure relates to industrial soldering methods and devices, and in particularly relates to a method and a device for solder recovery from dross.

BACKGROUND

During industrial soldering, a heated solder bath is maintained and it is necessary to scrape off dross from the top of the solder bath at frequent intervals, the dross primarily being formed of oxides of tin and good solder. The generation of dross is higher in a Sn—Ag—Cu alloy (Pb-free solder) than in a Sn—Pb solder (leaded solder).

Dross collected from industrial soldering contains a good amount of usable solder and an oxidized residue, which should be disposed. However, with conventional methods of solder recovery, the oxidized residue cannot be completely removed, and the oxidized residue still contains substantial amount of solder.

A conventional method of recovering solder from dross is through heating the dross and agitating the heated dross. The solder is collected subsequently after the operator has removed the upper oxidized residue with a ladle. However, this solder recovering method, in addition to removing the oxidized residue, also collects the usable solder. Further, as the process is more or less manual, it demands high level of user skill. Still, the efficiency is not what is expected. Further there are safety concerns, as the environment in which the process is carried out is generally dusty and temperatures are significantly high to work. The operation is generally very labour-intensive. Finally, there is a significant risk of operator exposure to flux fumes, which can be toxic.

Accordingly, there is need for a method and/or a device that is not only safe to use, but also efficient in terms of the amount of solder it helps recover from the dross.

BRIEF DESCRIPTION OF THE PRIOR ART

US2010187732 discloses a solder recovery device including a melter which melts solder dross stored in a melting crucible, an agitation unit which agitates the melted solder dross, so as to separate the melted solder dross up and down into an oxidized residue and a recycled solder in the melting crucible, and a suction unit which sucks the oxidized residue generated by the agitation, the suction unit sucking the oxidized residue in an upper portion of the melting crucible to be removed.

WO9525823 discloses an apparatus and a method for recovering solder from dross. Dross is poured into a heated chamber (1). The heated dross is then compressed by a piston (21) to force good solder out of the dross into a collecting tray (17), also referred to as a drain tray.

OBJECTS

Some of the objects of the system of the present disclosure, which satisfies at least one embodiment of the present disclosure are as follows:

It is an object of the system of the present disclosure to ameliorate one or more problems of the state of the art or to at least provide a useful alternative.

It is an object of the present disclosure to facilitate recovery of higher amounts of usable (good) solder from the dross than what is achievable using the conventional methods and/or devices.

Another object of the present disclosure is to provide an automated device for solder recovery from dross, which involves minimal human intervention and skill. Yet another object of the present disclosure is to provide a method and/or a device for solder recovery that is safe and easy to use.

SUMMARY OF THE INVENTION

According to a first embodiment, the invention provides an apparatus for solder recover, comprising:
  i) a chamber for receiving dross, the chamber being provided with an inlet for dross and an outlet through which recovered solder can pass;
  ii) a heater for heating dross in the chamber;
  iii) an agitator inside the chamber for agitating heated dross, to separate good solder from the residue.

According to a second embodiment, the invention provides a method of recovering solder from dross, the method comprising the steps of
  i) introducing dross into a chamber being provided with an inlet for dross and an outlet through which recovered solder can pass;
  ii) heating the dross;
  iii) stirring the dross;
  iv) allowing molten solder to flow out of the outlet after a period of time.

BRIEF DESCRIPTION OF DRAWINGS

The present disclosure will now be explained in relation to non-limiting accompanying drawings, in which.

DETAILED DESCRIPTION

Figure 1:
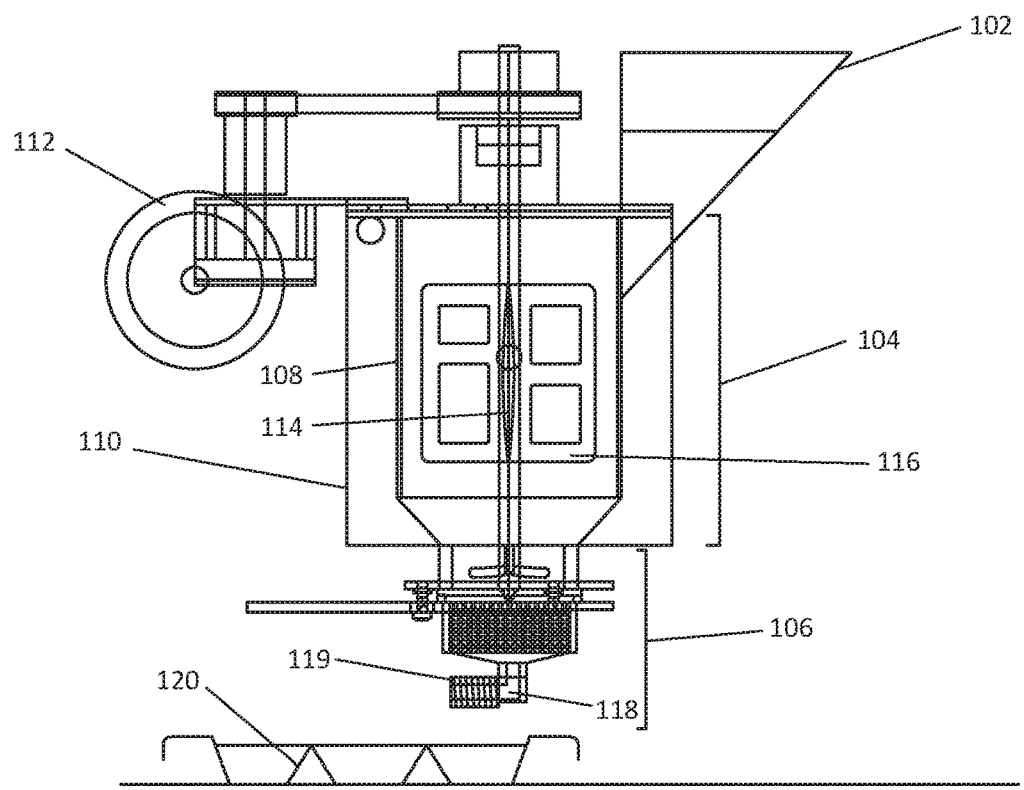
FIG. 1 illustrates a schematic representation of a solder recovery device (solder recovery device), in accordance with an embodiment of the present disclosure.

During soldering on an industrial scale, a heated solder bath is maintained and it is necessary to scrape off dross from the top of the solder bath at frequent intervals, the dross primarily being formed of oxides of tin and lead. However, up to 90% of the solder can be lost with the dross. Good solder can be reclaimed from the dross and conventionally this is done by simply heating the dross. However, this is a relatively inefficient method and barely economic.

It is understood that dross consists of pockets of good solder which are surrounded by a crust-like envelope of tin and lead oxides (in the case of lead solder) or other metal oxides (in the case of lead-free solder). In the existing technology, when the dross is heated and compressed, the oxide crust bursts and liquid solder can escape. In addition, any free solder in the dross removed from the solder bath will also be recovered.

In an improved method known in the art, the dross is heated and compressed with a piston. This leads to greater recovery of good solder compared with simply heating. Using this procedure, recovery of between 50 to 75% of the available solder is possible.

Surprisingly, it has now been found that if instead of compressing the solder, the dross is heated and appropriately agitated, e.g. with an impeller or stirring paddle, not only is greater recovery of solder realised, but also the recovered solder is of higher purity, including up to the manufacturer's specification. Using the method of the invention, between 65 and 85% solder recovery is possible.

An exemplary solder recovery device and a method of recovering solder from dross will now be described in accordance with the present disclosure and with reference to the accompanying drawings, which do not limit the scope and ambit of the disclosure. The description provided is purely by way of example and illustration.

The embodiments herein and the various features and advantageous details thereof are explained with reference to one or more non-limiting embodiment in the following description. Description of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Briefly the apparatus of the invention comprises a chamber for receiving dross, the chamber being provided with an inlet for dross and an outlet through which recovered solder can pass; a heater for heating dross in the chamber and an agitator inside the chamber for agitating heated dross, to separate good solder from the residue.

The chamber (also referred to as the "solder pot") may be of any suitable shape, but is typically generally cylindrical with a frustoconical lower end. This arrangement facilitates drainage of the solder from the chamber after agitation. The chamber may be formed of any suitable material, but necessarily must be capable of withstanding the temperatures employed during the process. Accordingly, metal is preferred, and stainless steel is more preferred.

The inlet (or "input section") is generally provided at or near the top of the chamber, so that dross may be fed into the chamber by gravity.

The outlet (or "output section") is generally provided at or near the base of the chamber. This enables good solder to be drained out of the chamber under the influence of gravity. In a preferred embodiment, the outlet is provided at the base of a frustoconical lower section of the chamber, to facilitate complete drainage of good solder from the chamber.

The heater can be any conventional heater known in the art, and can be, for example, an electrical heating element disposed either inside the chamber or around the outside of the chamber (the latter being preferred). The chamber can be, and preferably is, jacketed with insulating material to provide greater thermal stability and reduce power consumption. Heating by means of gas jets etc. is also a possibility.

The agitator preferably provides mechanical agitation to the dross contained within the chamber. This may be in the form of a vertical mashing motion, or a side-to-side motion, but preferably is provided by an agitator adapted to rotate within the chamber, such as a paddle or impeller.

The description hereinafter, of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

FIG. 1 illustrates a schematic representation of a solder recovery device (solder recovery device) 100, in accordance with an embodiment of the present disclosure. In the present embodiment, the solder recovery device includes an input section 102, a processing section 104 flow connected to the input section 102, and an output section 106 flow connected to the processing section 104. During operation, dross is poured into the solder recovery device 100 through the input section 102, which may be a hopper.

From the input section 102, the dross reaches the processing section 104. In an embodiment, the processing section 104 includes a solder pot 108, which is enclosed in an enclosure 110. The dross reaches the solder pot 108 where it is heated at high temperatures so as to melt the dross. The temperature inside the solder pot 108 depends on the melting point of the dross poured into the solder recovery device 100. In an implementation, the dross poured into the solder recovery device 100 is heated up to a temperature ranging from about 250° C. to 400° C. However, in other implementation, where, for example, hard solder is to be processed, the temperature may further be increased.

Once melted, the dross is agitated inside the solder pot 108. For this purpose, the solder recovery device 100 preferably includes at least one motor 112, whose drive shaft (shown in FIG. 8) is coupled to a rotor shaft 114, which passes through the solder pot 108 where the dross is to be heated. At a far end of the rotor shaft 114 inside the solder pot 108, an impeller 116 having one or more agitator blades is coupled to the rotor shaft 114. The motor 112, via the rotor shaft 114, rotates the impeller 116 in a clockwise/anticlockwise direction repeatedly so as to separate the dross from the good solder. In an embodiment, a geared motor powered by alternating current (AC) or direct current (DC) can be used. However, the present disclosure is not limited to any extent by the choice of the motor that is implemented for the purpose.

The good solder separated from the dross is drained out of the output section 106 via a drain valve 118. In an embodiment, the output section 106 is cooled by a cooling unit, such as a fan (shown in FIG. 3). Further, the output section 106 includes a filter device (shown in FIG. 4), which filters the solder before the solder leaves the output section 106 via the drain valve 118 into an ingot tray 120 (or drain tray).

In this way, the solder is separated from the dross and is recovered. The dross that is left inside the solder pot 108 after the solder recovery is residue. This residue is removed from the solder pot 108 using steps discussed in the later part of the description.

In a preferred embodiment, the sequence of heating, stirring and draining is operated under computer or microprocessor control. After the operator has introduced dross into the chamber, they initiate the microprocessor or computer, which controls the heating and stirring at the appropriate rates to obtain optimum good solder recovery, and then also controls the draining of the solder into the ingot tray.

Figure 2:
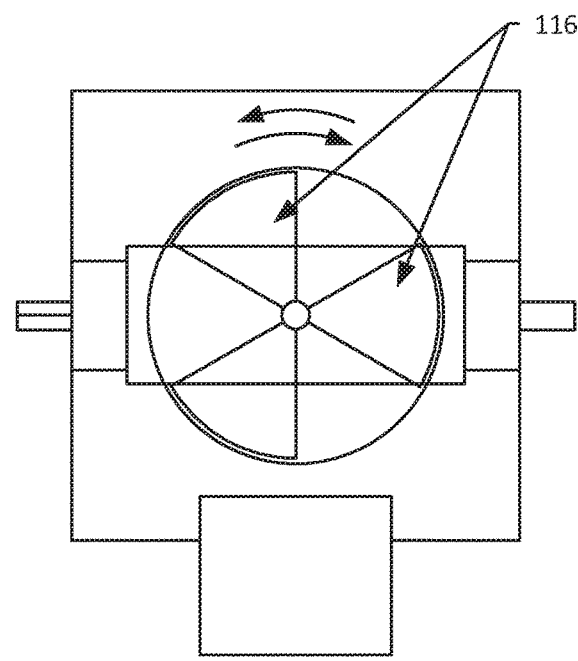
FIG. 2 illustrates a top view of the solder recovery device of FIG. 1 showing an impeller, in accordance with an embodiment of the present disclosure.

FIG. 2 illustrates a top view of the solder recovery device 100 of FIG. 1 showing the impeller 116, in accordance with an embodiment of the present disclosure. As shown, the impeller 116 is capable of rotating in clockwise/anti-clockwise directions via the motor 112 (shown in FIG. 1), thereby producing an agitating flow and centrifugal forces inside the solder pot 108. These forces and flows separate the solder from the dross. In an embodiment, the impeller 116 is coupled to the rotor shaft 114 of the motor 112. In the present embodiment, the impeller 116 has three blades. However, it will be appreciated by a person skilled in the art that the number of blades may be less than or more than the number of blades as disclosed in the present embodiment, depending on the requirement in particular setting. In an embodiment, the blades of the impeller 116 are attached offset to a central axis of the rotor shaft 114 so as to provide a slanted configuration of the blades with respect to the rotor shaft 114. Slanting or tapering provides efficient dross removal. In an embodiment, the impeller 116 is rotated in a direction opposite to the direction of the slant of the blades so as to provide a screw conveyor type action. For example, if the blades are offset towards left of the rotor shaft 114 so as to give a clockwise configuration when seen in line with the axis of the rotor shaft 114 from a side where the impeller is attached to the rotor shaft 114. With such a configuration of the blades, the motor 112 is configured to rotate in the opposite direction, i.e., in the anti-clockwise direction.

Figure 3:
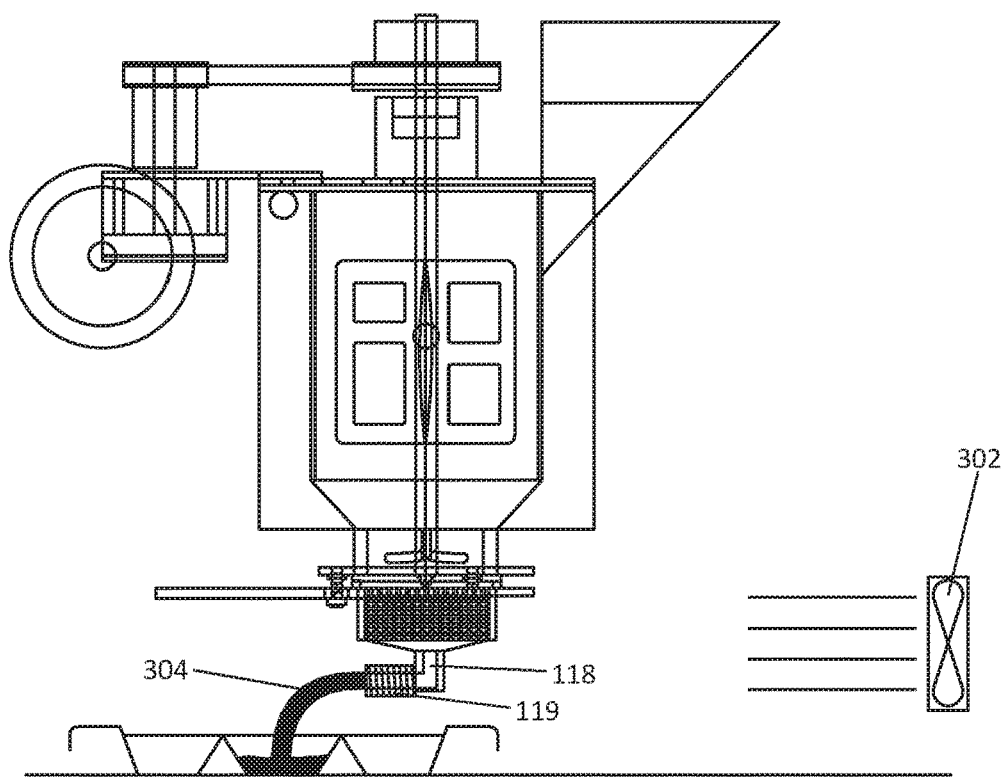
FIG. 3 illustrate another schematic representation of the solder recovery device 100 in operation, in accordance with an embodiment of the present disclosure.

FIG. 3 illustrate another schematic representation of the solder recovery device 100 in operation, in accordance with an embodiment of the present disclosure.

Here, the cooling unit is shown as a fan 302, which is placed near the output section 106 of the solder recovery device 100 from where the good solder 304 drains out. The fan 302 could be an external fan or a fan inbuilt in the solder recovery device 100 itself. In an implementation, the drain valve 118 lets the good solder 305 flow out of the drain valve 118 automatically when the fan 302 is stopped. The stop/flow of the good solder through the drain valve 118 is governed by the conduction of heat inside the solder pot 108. When the fan 302 is ON and in running condition, the heat is taken away from the drain valve 118 and because of that, a temperature around the drain valve 118 falls below the melting point of the dross inside the solder pot 108. Because of this, the good solder 304 stops flowing. When the fan 302 is OFF, and the temperature around the drain valve 118 is equivalent to the melting temperature of the dross, the good solder 304 starts flowing out of the drain valve 118. In a preferred embodiment, heater (119) is added on the drain valve (118). It will start heating if the molten solder does not come out in a stipulated time.

Figure 4:
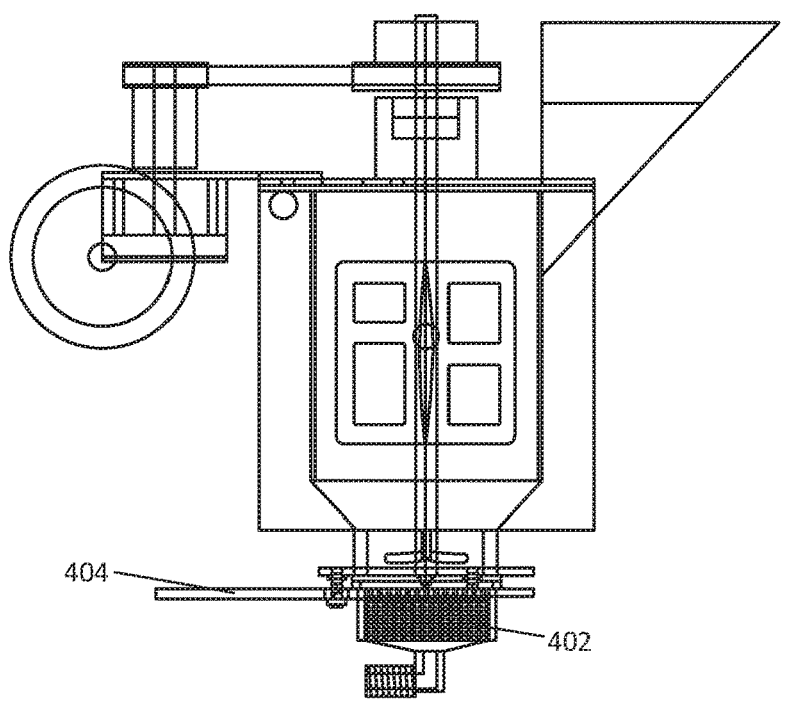
FIG. 4 illustrates another schematic representation of the solder recovery device of FIG. 1 with a filter device, in accordance with an embodiment of the present disclosure.

FIG. 4 illustrates a schematic representation of the solder recovery device 100 of FIG. 1 with a filter device 402, in accordance with an embodiment of the present disclosure. As shown, the output section 106 of the solder recovery device 100 includes the filter device 402, which filters the solder that is drained out of the solder recovery device 100 through the output section 106. The filter device 402 is positioned in the output section 106 just above the drain valve 118. In an embodiment, the filter device 402 is a removable gauze filter having at least a perforated steel disc and stainless steel wool trapped inside the filter device 402 by the perforated steel disc (shown in FIG. 10). The filter device 402 can be removed and cleaned after a few cycles of solder removal and may also be replaced after completing its cycle. For the purpose, a handle 404 is provided which is attached to the filter device 402 and allows attachment/detachment of the filter device 402 to/from the solder recovery device 100.

Figure 5:
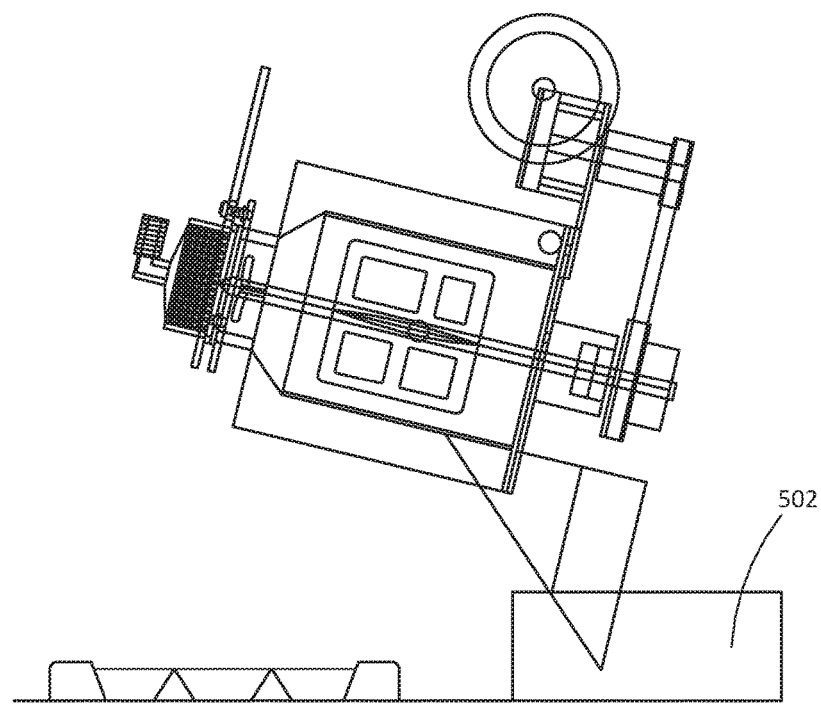
FIG. 5 illustrates removal of residue from the solder recovery device of FIG. 1 following solder recovery, in accordance with an embodiment of the present disclosure.

FIG. 5 illustrates removal of the residue from the solder recovery device 100 of FIG. 1 following solder recovery, in accordance with an embodiment of the present disclosure. Following draining out the good solder from the solder recovery device 100, the residue that remains inside the solder pot 108 is removed into a separate dross container 502. For the purpose, the solder recovery device 100 is tilted using a tilting mechanism (shown in FIG. 6), which can be a motor, separate from the motor 112, coupled to an appropriate transmission mechanism. In an embodiment, the motor for tilting the solder recovery device 100 is coupled to the solder recovery device 100 via a chain and sprocket arrangement (shown in FIG. 6). When activated, the motor for tilting, through the chain and sprocket arrangement, makes the solder recovery device 100 tilt at a predetermined angle, so as to let the residue removed from the solder recovery device 100, for example, through the same input section 102 (i.e., via the hopper) from which the dross to be processed was initially poured into the solder recovery device 100. In addition to the tilting, the impeller 116 is also rotated simultaneously using the motor 112, so as to remove almost the entire residue deposited inside the solder pot 108 following recovery of the solder.

The pivotal mounting of the chamber is advantageous, as it permits easy emptying of the unwanted products of the process, typically a powder of oxides of metal. It also minimizes the surface area or "footprint" of the device, meaning it occupies a smaller space than alternative apparatus.

FIGS. 6 to 10 show actual representation of the solder recovery device 100 as well as various parts/components of the solder recovery device 100 discussed hereinbefore, in accordance with an embodiment.

Figure 6:
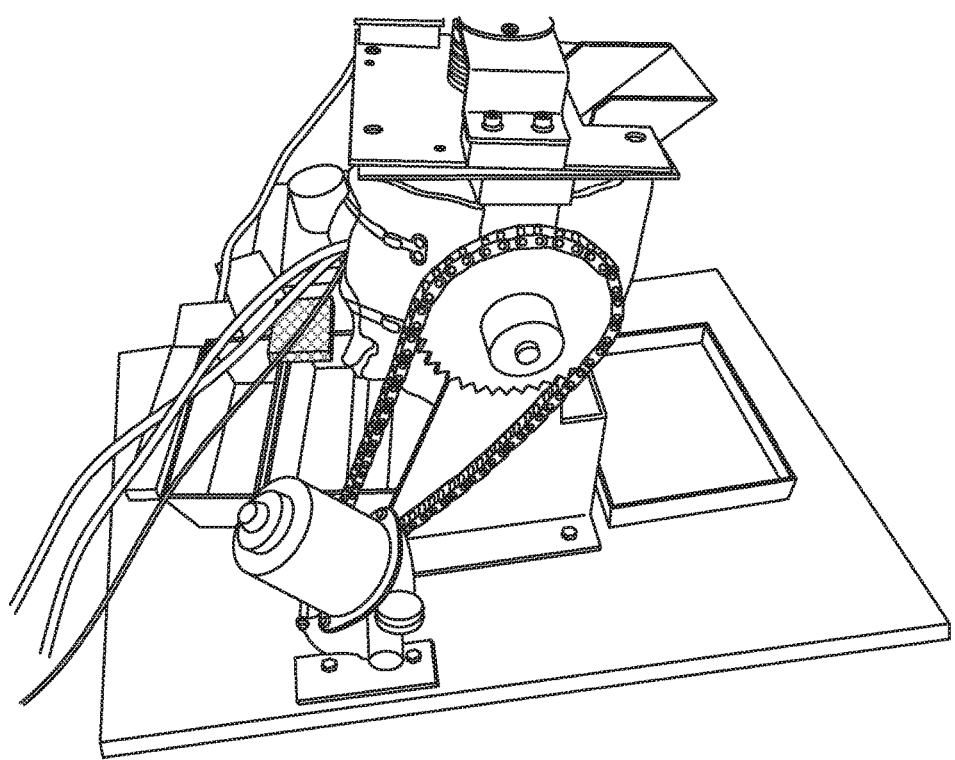
FIG. 6 illustrates an actual representation of a solder recovery device showing a tilting arrangement, in accordance with an embodiment of the present disclosure.

For example, FIG. 6 illustrates an actual representation of the solder recovery device 100 shown from a side where a tilting mechanism 602 is provided. The tilting mechanism is, in the present embodiment, is a chain and sprocket arrangement 602 coupled to a motor 604.

Figure 7:
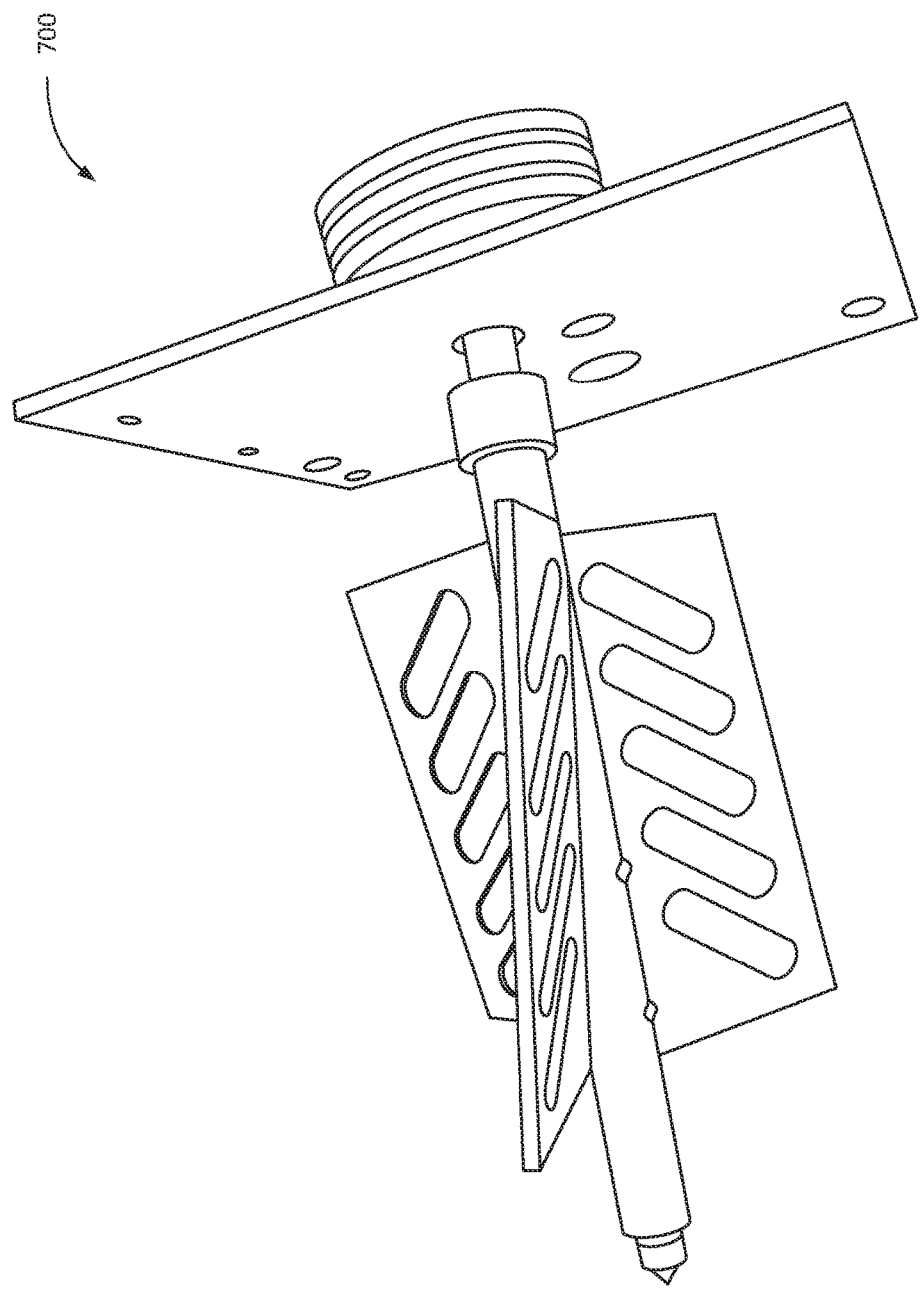
FIG. 7 illustrates an actual representation of the impeller of the solder recovery device of FIG. 6, in accordance with an embodiment of the present disclosure.

FIG. 7 illustrates an actual representation of an impeller 116 of the solder recovery device 100, in accordance with an embodiment of the present disclosure. The impeller 116 is coupled to the rotor shaft 114 such that an axis of the impeller 116 is in line with an axis of the rotor shaft 114.

Preferably, the impeller includes a plurality of blades disposed radially about a central shaft. Preferably, the blades are slanted or tapered to provide a screw action. Preferably, each blade comprises one or more slots to enhance the agitating effect when rotated.

Figure 8:
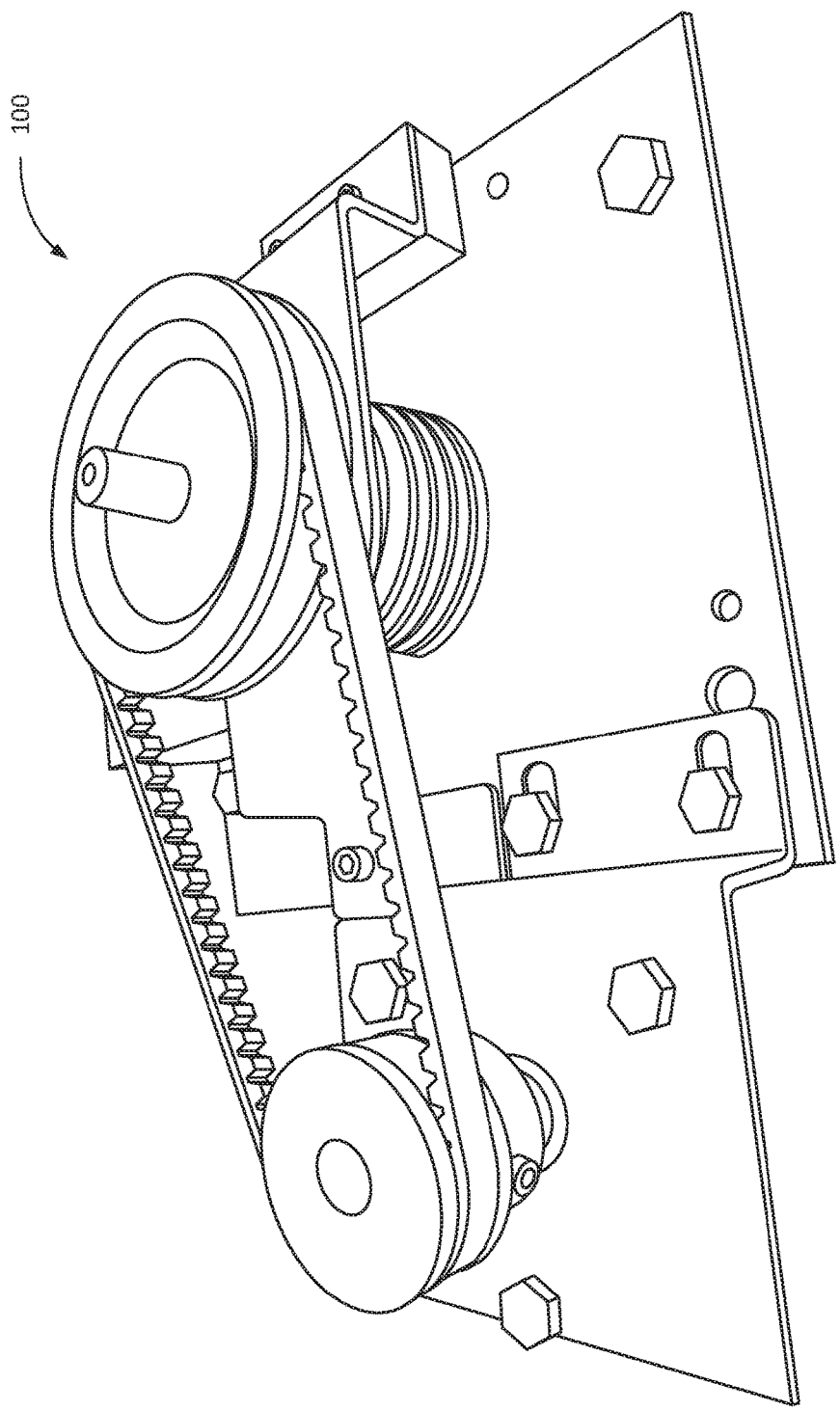
FIG. 8 illustrates an actual representation of the solder recovery device of FIG. 6 showing the coupling of a motor with a rotor shaft of the solder recovery device, in accordance with an embodiment of the present disclosure.

FIG. 8 illustrates an actual representation of the coupling of the motor 112 with the rotor shaft 114 of the solder recovery device 100, in accordance with an embodiment of the present disclosure. The rotor shaft 114 is shown to be coupled to the motor 112 via a belt and pulley mechanism 802.

Figure 9:
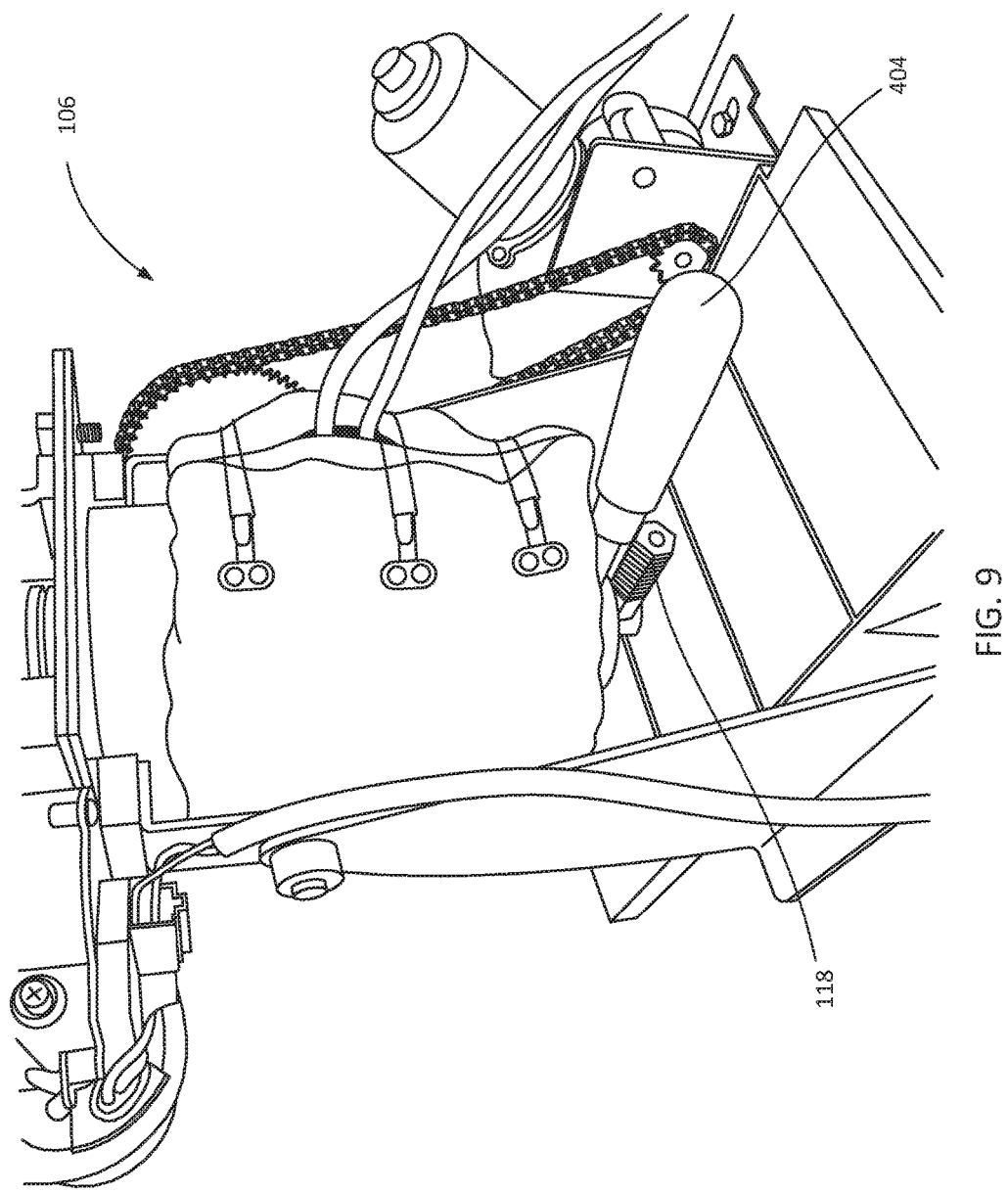
FIG. 9 illustrates another actual representation of the solder recovery device of FIG. 6 showing an output section of the solder recovery device, in accordance with an embodiment of the present disclosure.

FIG. 9 illustrates an actual representation of the output section 106 of the solder recovery device 100 of FIG. 1, in accordance with an embodiment of the present disclosure. The output section 106, among other things, is shown enclosed in a heat protective covering so as to avoid unwanted heat losses.

Figure 10A:
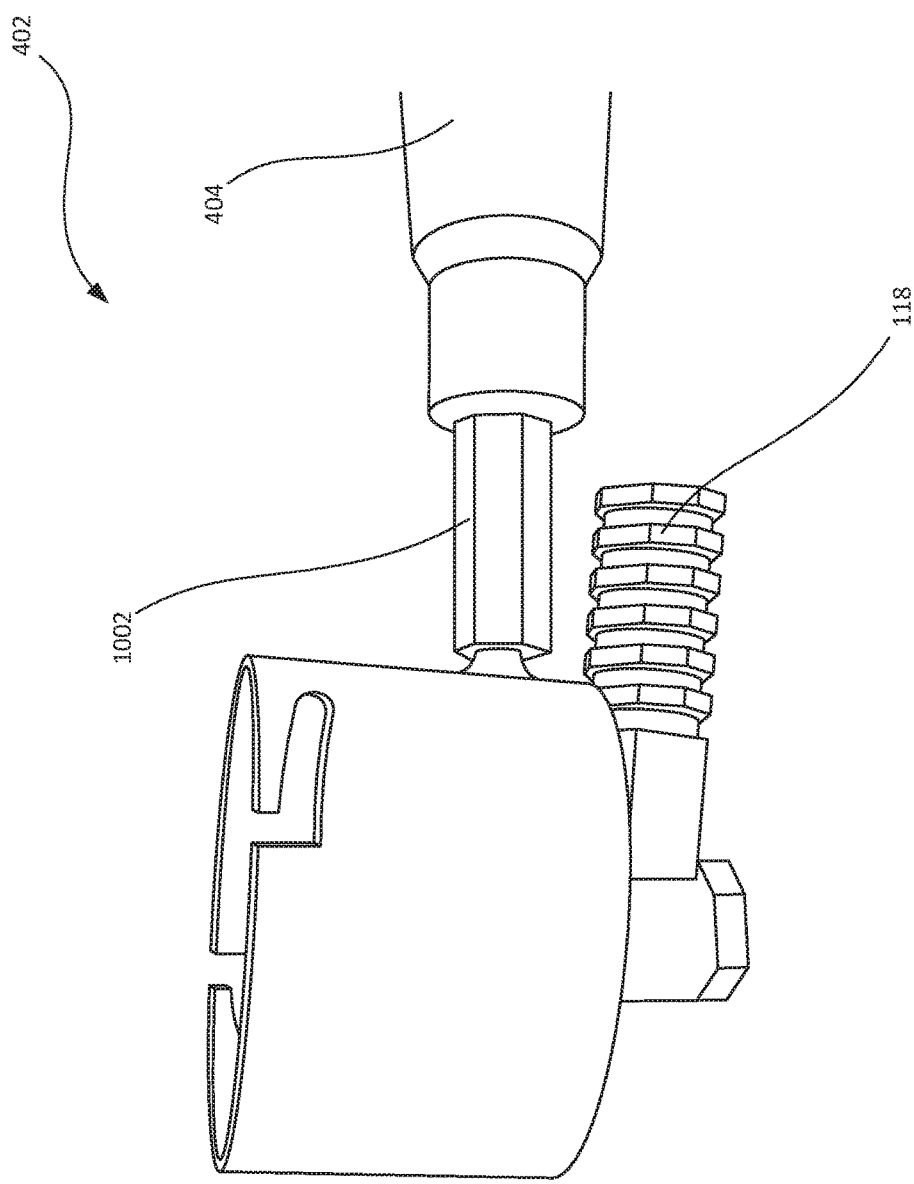
FIG. 10 illustrates various representations of the filter device of the solder recovery device of FIG. 6, in accordance with an embodiment of the present disclosure.

FIG. 10 illustrates various representations of the filter device 402 of the solder recovery device 100 of FIG. 1, in accordance with an embodiment of the present disclosure. The filter device 402 is in the form of a cylindrical enclosure. Further, the drain valve 118 attached to one end of the filter device 402 as shown. The handle 404 is connected to the filter device 402 via a coupler 1002.

Figure 10B:
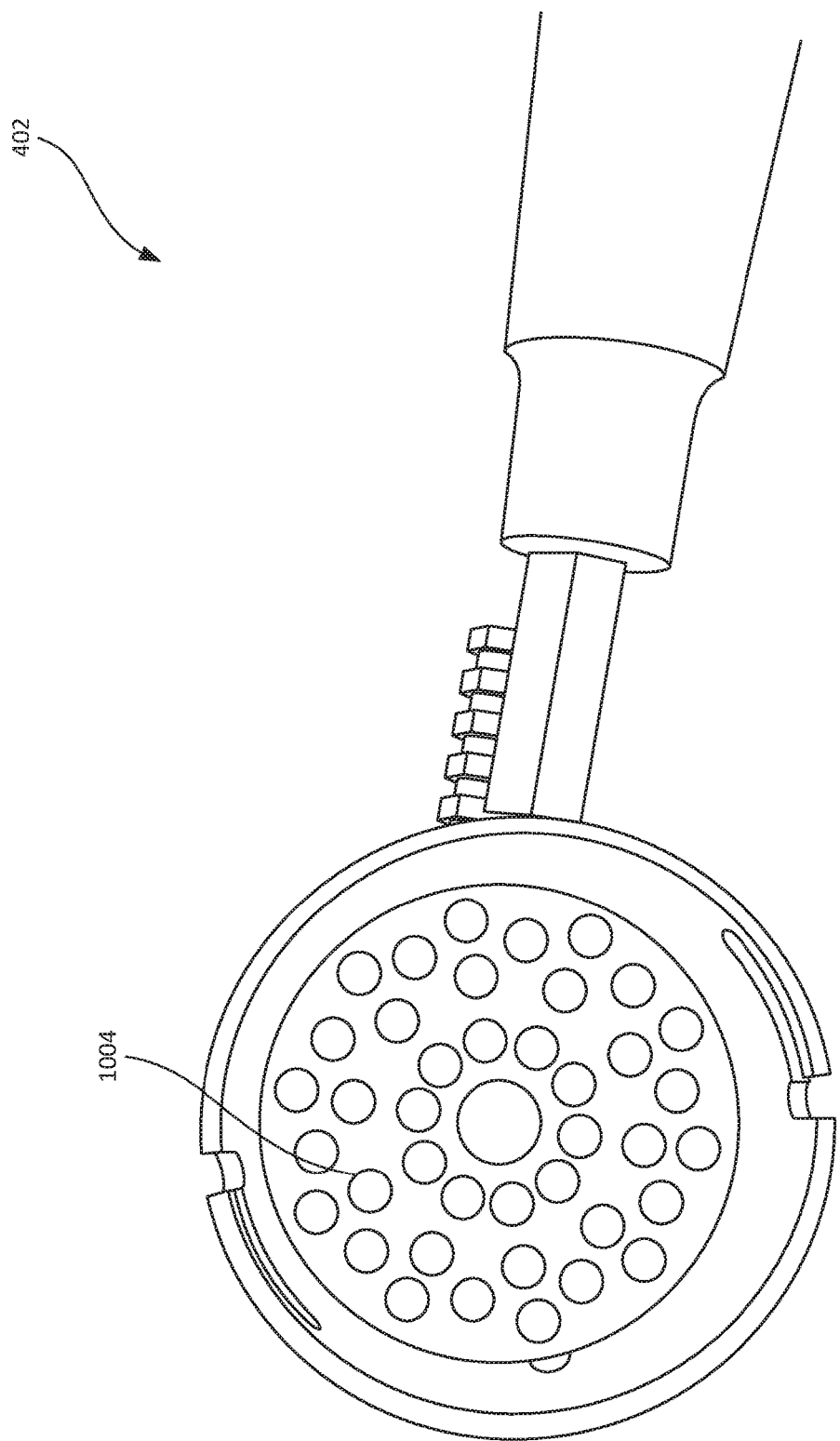

FIG. 10b shows a top perspective view of the filter device 402. As shown, a removable perforated disc 1004 is placed inside the filter device 402 for allowing dross to flow out slowly. FIG. 10c shows a perspective view of the filter device 402 illustrating the removable perforated disc 1002 and a steel wool 1006. The steel wool is placed below the perforated disc 1004 and taps impurities in the solder draining out of the drain valve 118.

Figure 11:
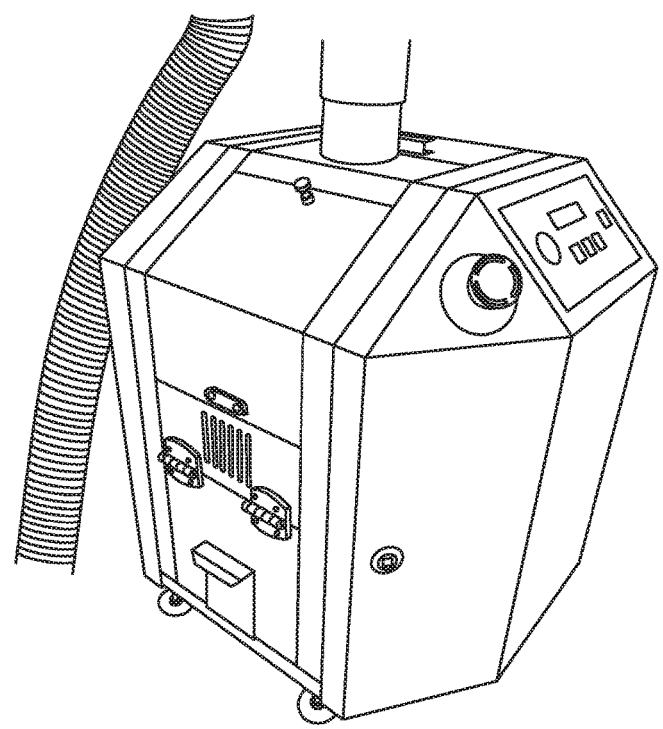
FIG. 11 is a photograph of a complete unit according to the invention.

FIG. 11 is a perspective view of a solder recovery device according to one embodiment of the invention. Ducting for extraction of hazardous fumes is shown at the top of the unit.

Figure 12:
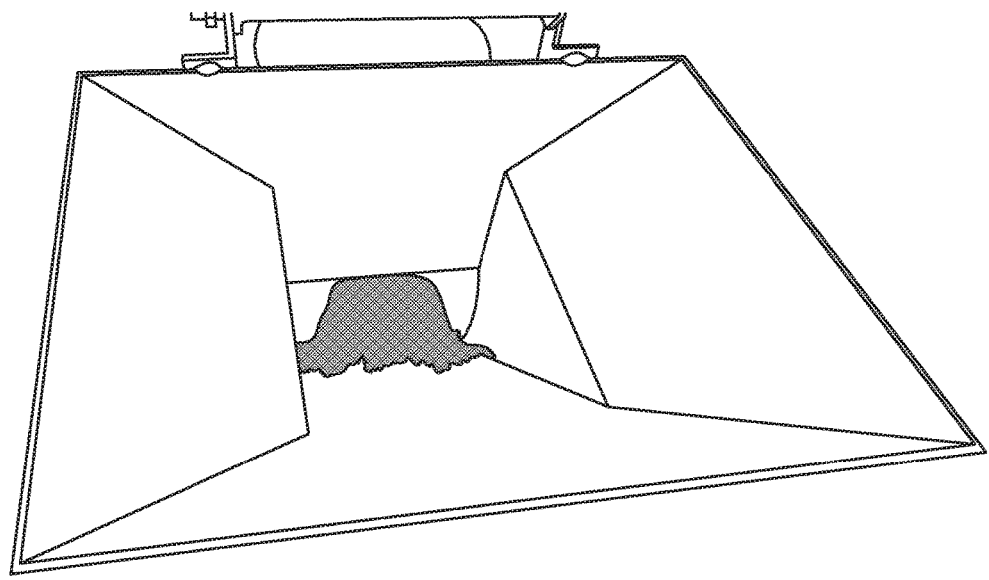
FIG. 12 is a photograph of dross being loaded into the inlet hopper of the device.

FIG. 12 is a perspective view of the inlet, or input section, showing dross being introduced into the device.

Figure 13:
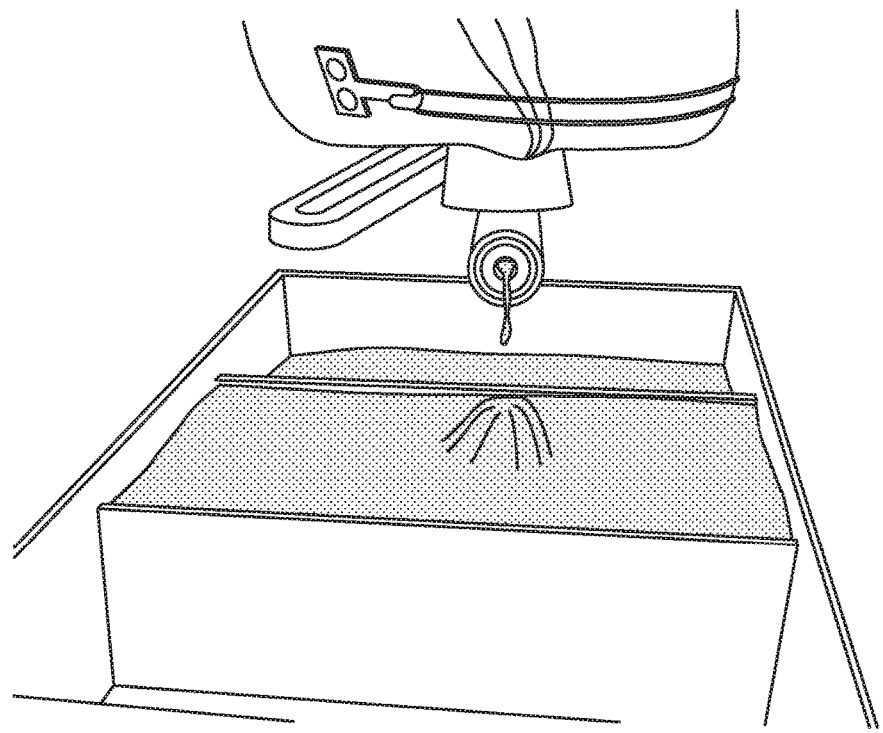
FIG. 13 is a photograph of recovered solder pouring from the outlet of the device into a solder collection tray.

FIG. 13 shows recovered solder flowing from the outlet, and into the drain tray.

Figure 14:
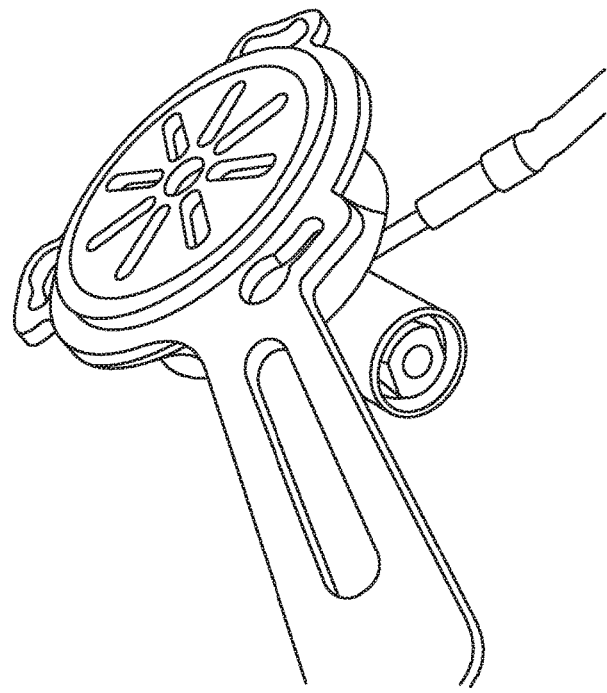
FIG. 14 is a photograph of the filter unit of the apparatus.
Figure 15:
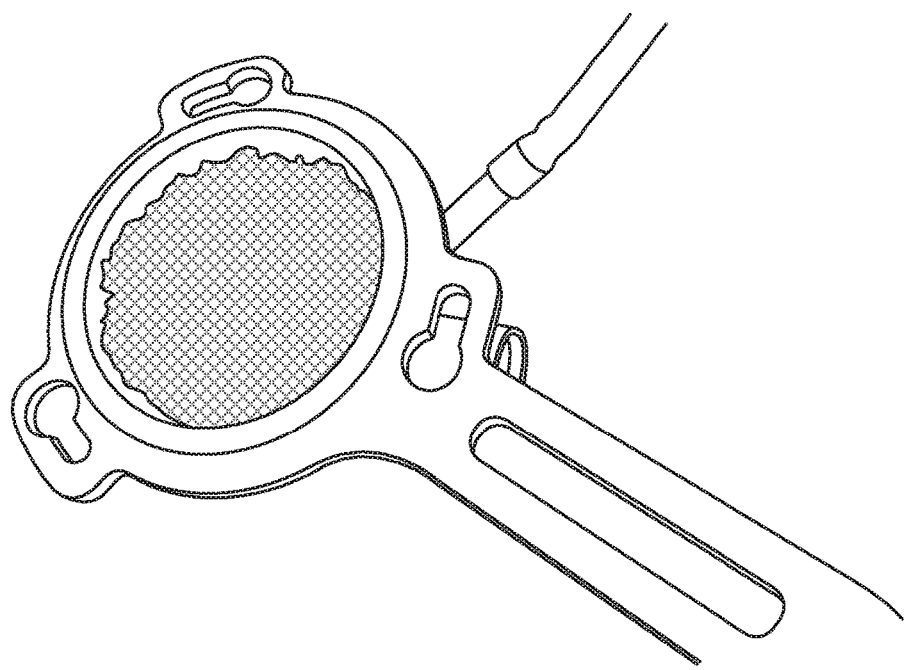
FIG. 15 is a photograph of the filter unit, showing the filtration medium inside.

FIG. 14 shows an alternative embodiment of the filter device, which includes a slotted cover. FIG. 15 shows the filter device with the cover removed, showing the filtration medium (in this case wire wool) inside.

Figure 16:
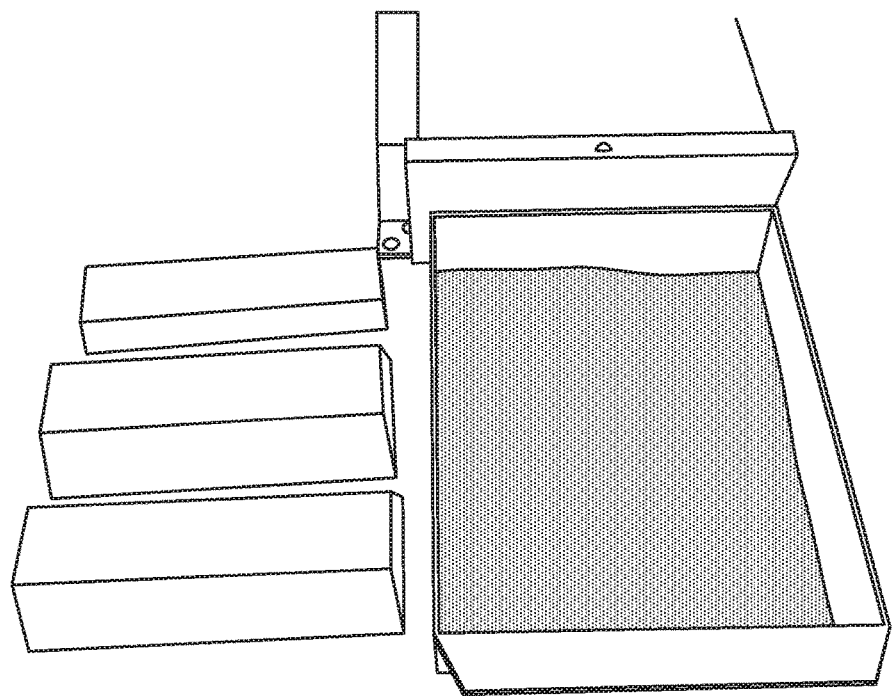
FIG. 16 shows ingots of solder recovered from dross (left hand), together with waste oxide by-product (right hand).

FIG. 16 shows ingots of recovered solder, together with the by-product of the process, in the form of metal oxides.

In this way, maximum amount of good solder is recovered without involving any human skill or any unnecessary labour. Moreover, as the solder pot 108 is placed inside the enclosure 110, the whole process of solder recovery is also safe for handlers.

TECHNICAL ADVANCEMENTS AND ECONOMICAL SIGNIFICANCE

The technical advancements offered by the system of the present disclosure which add to the economic significance of the disclosure include the realization of:

a) a device for recovering good solder from dross to the maximum possible extent;

b) a cost-effective method of solder recovery from dross;

c) a method and a device that facilitate safe and secure solder recovery from dross with minimum human intervention and labour.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment to achieve one or more of the desired objects or results.

Any discussion of documents, acts, materials, devices, articles or the like that has been included in this specification is solely for the purpose of providing a context for the disclosure. It is not to be taken as an admission that any or all of these matters form part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

The invention claimed is:

1. Apparatus for solder recover, comprising:
   i) a chamber for receiving dross, the chamber being provided with an inlet for dross and an outlet through which recovered solder can pass;
   ii) a heater for heating dross in the chamber; and
   iii) an agitator inside the chamber for agitating heated dross, to separate good solder from the residue;
   wherein the outlet is provided with a heater which when activated, melts the solder at the outlet and allows solder to flow out of the chamber, thereby controlling the flow of solder out of the chamber.

2. Apparatus according to claim 1 wherein the inlet is provided at or near the top of the chamber.

3. Apparatus according to claim 1, wherein the outlet is provided at or near the bottom of the chamber.

4. Apparatus according to claim 1, wherein the outlet is provided with a filter to allow the passage of molten solder, whilst retaining residue.

5. Apparatus according to claim 1, wherein the agitator is a stirrer.

6. Apparatus according to claim 5, wherein the stirrer is an impeller.

7. Apparatus according to claim 6 wherein the impeller includes a plurality of blades disposed radially about a central shaft.

8. Apparatus according to claim 7 wherein the blades are slanted or tapered to provide a screw action.

9. Apparatus according to claim 1 comprising a drain tray positioned below the outlet and adapted to receive the molten solder from the chamber.

10. Apparatus according to claim 1, further comprising a housing to which the chamber is pivotally mounted to allow for the chamber to be tilted and dross tipped out.

11. A method of recovering solder from dross, the method comprising the steps of
   i) introducing dross into the chamber of the apparatus according to claim 1;
   ii) heating the dross;
   iii) agitating the dross; and
   iv) allowing molten solder to flow out of the outlet after a period of time.

12. Method according to claim 11 wherein the agitating is carried out with an impeller.

13. Method according to claim 11 wherein the agitating is carried out with a stirrer, and wherein the agitating is conducted in an alternating clockwise and anticlockwise motion.

14. Method according to claim 11 wherein the chamber is heated to between 250 and 400° C.

15. Method according to claim 12 wherein the agitating is conducted in an alternating clockwise and anticlockwise motion.

16. Method according to claim 12 wherein the chamber is heated to between 250 and 400° C.

\* \* \* \* \*